United States Patent
Xiao

(10) Patent No.: US 12,470,101 B2
(45) Date of Patent: Nov. 11, 2025

(54) ROTOR FOR DISC PERMANENT MAGNET MOTOR AND DISC PERMANENT MAGNET MOTOR COMPRISING THE SAME

(71) Applicant: Zhongshan Broad-Ocean Motor Co., Ltd., Zhongshan (CN)

(72) Inventor: Rui Xiao, Zhongshan (CN)

(73) Assignee: ZHONGSHAN BROAD-OCEAN MOTOR CO., LTD., Zhongshan (CN)

( * ) Notice: Subject to any disclaimer, the term of this patent is extended or adjusted under 35 U.S.C. 154(b) by 230 days.

(21) Appl. No.: 18/539,183

(22) Filed: Dec. 13, 2023

(65) Prior Publication Data

US 2024/0113581 A1 Apr. 4, 2024

Related U.S. Application Data

(63) Continuation-in-part of application No. PCT/CN2022/079835, filed on Mar. 9, 2022.

(30) Foreign Application Priority Data

Aug. 4, 2021 (CN) .......................... 202110889521.7

(51) Int. Cl.
  *H02K 1/2795* (2022.01)
  *H02K 21/24* (2006.01)
(52) U.S. Cl.
  CPC .......... *H02K 1/2795* (2022.01); *H02K 21/24* (2013.01)
(58) Field of Classification Search
  CPC ..... H02K 1/2713; H02K 1/2733; H02K 1/243
  (Continued)

(56) References Cited

U.S. PATENT DOCUMENTS 7,759,837 B2 * 7/2010 Ishikawa ................ H02K 1/243
  310/263
2007/0267929 A1 * 11/2007 Pulnikov .............. H02K 1/2713
  310/263

(Continued)

FOREIGN PATENT DOCUMENTS

CN 103095004 A 5/2013
CN 104518585 A 4/2015

(Continued)

OTHER PUBLICATIONS

Guo Tao et al., Concentrated transverse flux permanent magnetic propulsive synchronous motor, Journal of Tsinghua University (Science and Technology), Oct. 2007, pp. 1562-1565, vol. 47, No. 10, Tsinghua University, Beijing, China.

*Primary Examiner* — Christopher M Koehler
*Assistant Examiner* — Ahmed F Seck
(74) *Attorney, Agent, or Firm* — MATTHIAS SCHOLL P.C.; Matthias Scholl

(57) ABSTRACT

A rotor for a disc permanent magnet motor, includes: a first rotor core; a second rotor core; and a plurality of magnetic tiles. The first rotor core includes a first annular ring and a plurality of first magnetic blocks protruding at intervals from an outer side of the first annular ring in a circumferential direction, and a first groove is formed between every two adjacent first magnetic blocks. The second rotor core includes a second annular ring and a plurality of second magnetic blocks protruding at intervals from an outer side of the second annular ring in a circumferential direction, and a second groove is formed between every two adjacent second magnetic blocks. The first rotor core and the second rotor core are axially embedded with each other. The first magnetic blocks are embedded in the second grooves. The second magnetic blocks are embedded in the first grooves.

13 Claims, 12 Drawing Sheets

(58) Field of Classification Search
USPC .............................. 310/156.66, 156.69, 263
See application file for complete search history.

(56) References Cited

U.S. PATENT DOCUMENTS

| | | | |
|---|---|---|---|
| 2011/0115332 A1* | 5/2011 | Fukuzawa .............. | H02K 1/145 |
| | | | 310/257 |
| 2013/0121856 A1* | 5/2013 | Yamada .................. | F04D 13/06 |
| | | | 417/410.1 |
| 2015/0084466 A1* | 3/2015 | Tsuchiya .............. | H02K 1/2733 |
| | | | 310/156.07 |
| 2015/0084470 A1* | 3/2015 | Takemoto ............ | H02K 1/2733 |
| | | | 310/156.69 |
| 2015/0222152 A1* | 8/2015 | Yamada .................. | H02K 29/08 |
| | | | 29/598 |
| 2016/0248283 A1* | 8/2016 | Takemoto .............. | H02K 37/12 |
| 2017/0214281 A1 | 7/2017 | Seo | |
| 2017/0244293 A1 | 8/2017 | Kanda | |

FOREIGN PATENT DOCUMENTS

| | | |
|---|---|---|
| CN | 109474097 A | 3/2019 |
| CN | 111541325 A | 8/2020 |
| CN | 111969744 A | 11/2020 |
| CN | 111969821 A | 11/2020 |
| CN | 112564346 A | 3/2021 |
| CN | 113595283 A | 11/2021 |
| WO | 2015005045 A1 | 1/2015 |

* cited by examiner

ROTOR FOR DISC PERMANENT MAGNET MOTOR AND DISC PERMANENT MAGNET MOTOR COMPRISING THE SAME

CROSS-REFERENCE TO RELATED APPLICATIONS

This application is a continuation-in-part of International Patent Application No. PCT/CN2022/079835 with an international filing date of Mar. 9, 2022, designating the United States, now pending, and further claims foreign priority benefits to Chinese Patent Application No. 202110889521.7 filed Aug. 4, 2021. The contents of all of the aforementioned applications, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 245 First Street, 18th Floor, Cambridge, MA 02142.

BACKGROUND

The disclosure relates to a rotor for a disc permanent magnet motor and a disc permanent magnet motor comprising the same.

Conventional disc permanent magnet motors adopt a surface mounted axial magnetic field structure, which leads to the following shortcomings: firstly, to improve the air gap magnetic flux density, the thickness of the surface mounted magnetic steel needs to be increased; however, much more increased thickness only leads to little increase in the air gap magnetic flux density, thus reducing the utilization rate of magnetic steel; secondly, the motors with a surface mounted axial magnetic field have a relatively large inertia; in some applications, the radial size must be enlarged to increase the torque, while the inertia has to be controlled in a certain range; the two conditions may conflict; thirdly, when the rotor rotates, there may be friction between the rotor and stator.

Built-in motors refer to motors with a permanent magnet embedded in the rotor core, as shown in FIG. 1, a built-in arc-shaped permanent magnet structure. The magnetic field of traditional built-in permanent magnet motors is generally arranged in an N-S-N-S manner to form a closed-loop magnetic field inside the rotor. Therefore, the permanent magnet 1A is magnetized in two directions. The structure needs to distinguish the magnetic pole direction of the permanent magnet 1A when assembling the rotor, otherwise it can easily lead to incorrect polarity of the permanent magnet, causing motor damage, and complicated assembly process.

SUMMARY

The disclosure provides a rotor for a disc permanent magnet motor and a disc permanent magnet motor comprising the same.

The rotor for a disc permanent magnet motor, comprises: a first rotor core; a second rotor core; and a plurality of magnetic tiles. The first rotor core comprises a first annular ring and a plurality of first magnetic blocks protruding at intervals from an outer side of the first annular ring in a circumferential direction, and a first groove is formed between every two adjacent first magnetic blocks; the second rotor core comprises a second annular ring and a plurality of second magnetic blocks protruding at intervals from an outer side of the second annular ring in a circumferential direction, and a second groove is formed between every two adjacent second magnetic blocks; the first rotor core and the second rotor core are axially embedded with each other; the first magnetic blocks are embedded in second grooves, and the second magnetic blocks are embedded in first grooves; each of the plurality of second magnetic blocks comprises two sides, and a first side groove and a second side groove are respectively formed between the two sides and two adjacent first magnetic blocks; an axial thickness $H1$ of the second magnetic blocks is smaller than an axial thickness $H2$ of the first magnetic blocks, so that a first top surface of the second magnetic blocks is lower than a second top surface of two adjacent first magnetic blocks, thereby forming a top groove on the second magnetic blocks; each of the plurality of magnetic tiles comprises a top tile, a first side tile and a second side tile, and the first side tile and the second side tile are respectively connected to two ends of the top tile; the top tile is embedded in the top groove, and the first side tile and the second side tile are respectively embedded in the first side groove and the second side groove, respectively.

In a class of this embodiment, each of the first magnetic blocks is connected to the first annular ring through a first connecting rib; a thickness of the first annular ring is the same as that of the first connecting rib, and the axial thickness of the first magnetic blocks is greater than the thickness of the first annular ring.

In a class of this embodiment, each of the second magnetic blocks is connected to the second annular ring through a second connecting rib; a thickness of the second annular ring is the same as that of the second connecting rib, and the axial thickness of the second magnetic blocks is greater than the thickness of the second annular ring.

In a class of this embodiment, the cross-sectional shape of the magnetic tile is a "U" shape.

In a class of this embodiment, the top tile is a fan-shaped plate.

In a class of this embodiment, the first magnetic blocks and the second magnetic blocks are fan-shaped blocks.

In a class of this embodiment, the first side tile and the second side tile are flat plates, and are radially aslant embedded into the first side groove and the second side groove, respectively, with an inclination angle $\alpha$.

In a class of this embodiment, the inclination angle $\alpha$ is in the range of 2.5°-7.5°.

In a class of this embodiment, the first annular ring is integrated with the first connecting rib and located at a top end of the rotor; the second annular ring is integrated with the second connecting rib and located at a bottom end of the rotor; and the first annular ring is spaced apart from the second annular ring.

In a class of this embodiment, the first side tile and the second side tile are perpendicular to the top tile or are inclined relative to the top tile.

In a class of this embodiment, two sides of a top surface of each of the first magnetic blocks comprise a first flange, and two first flanges abut against the top tile to limit an axial movement of the magnetic tiles; an inner end and an outer end of each of the second magnetic blocks comprise a second flange, and the top tile is disposed between two second flanges, and thus a radial movement of the magnetic tiles is limited.

In a class of this embodiment, the magnetization directions of the magnetic tiles are consistent, from inside to outside or from outside to inside.

In another aspect, the disclosure also provides a disc permanent magnet motor comprising a stator assembly and a rotor assembly; the stator assembly is axially magnetically coupled to the rotor assembly, and the rotor assembly comprises the abovementioned rotor.

The following advantages are associated with a rotor for a disc permanent magnet motor and a disc permanent magnet motor comprising the same of the disclosure.

The rotor for a disc permanent magnet motor, comprises a first rotor core; a second rotor core; and a plurality of magnetic tiles. The first rotor core and the second rotor core are axially embedded with each other; the first magnetic blocks are embedded in second grooves, and the second magnetic blocks are embedded in first grooves. The magnetic tiles comprise the top tile, the first side tile and the second side tile, so that the rotor comprises axial and radial magnetic fields. Under the mixed effect of axial and radial magnetic fields, the magnetic field density is increased, achieving mixed magnetization of the rotor, thereby improving the magnetization effect of the motor. In addition, due to the simplification of the first rotor core and the second rotor core, the number of assembled parts for the rotor is reduced, which can effectively reduce the difficulty of the rotor manufacturing process and improve the production efficiency of the rotor.

DETAILED DESCRIPTION

To further illustrate the disclosure, embodiments detailing a rotor for a disc permanent magnet motor and a disc permanent magnet motor comprising the same are described below. It should be noted that the following embodiments are intended to describe and not to limit the disclosure.

Example 1

Figure 1:
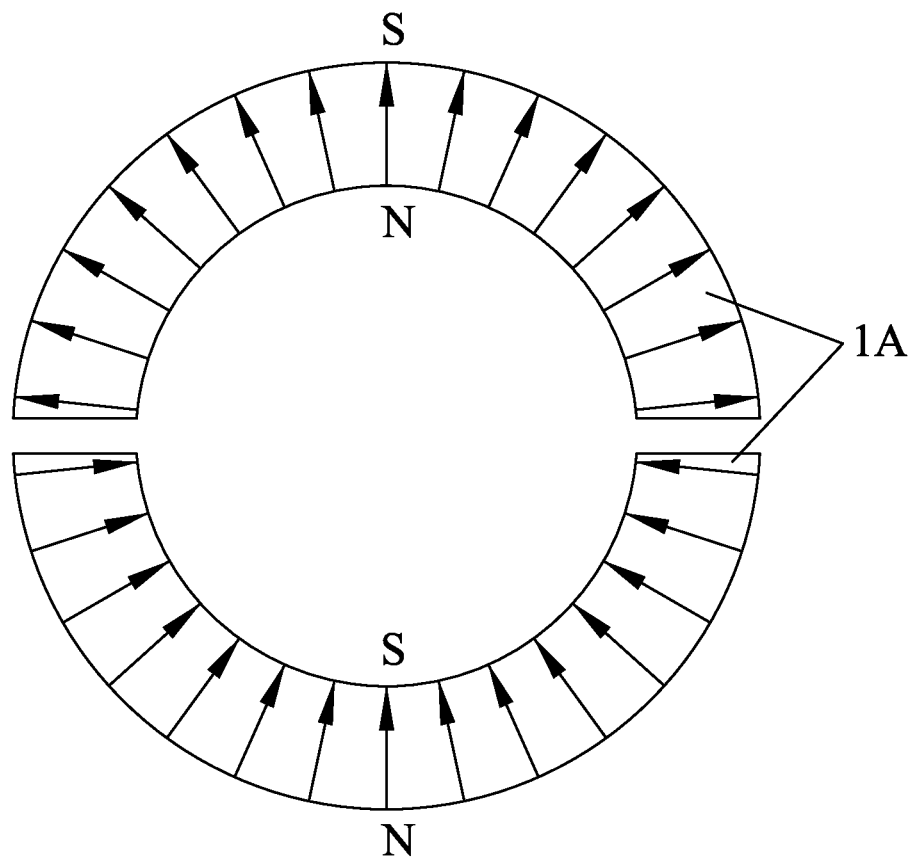
FIG. 1 is a schematic diagram of the magnetization direction of a permanent magnet in related art.
Figure 2:
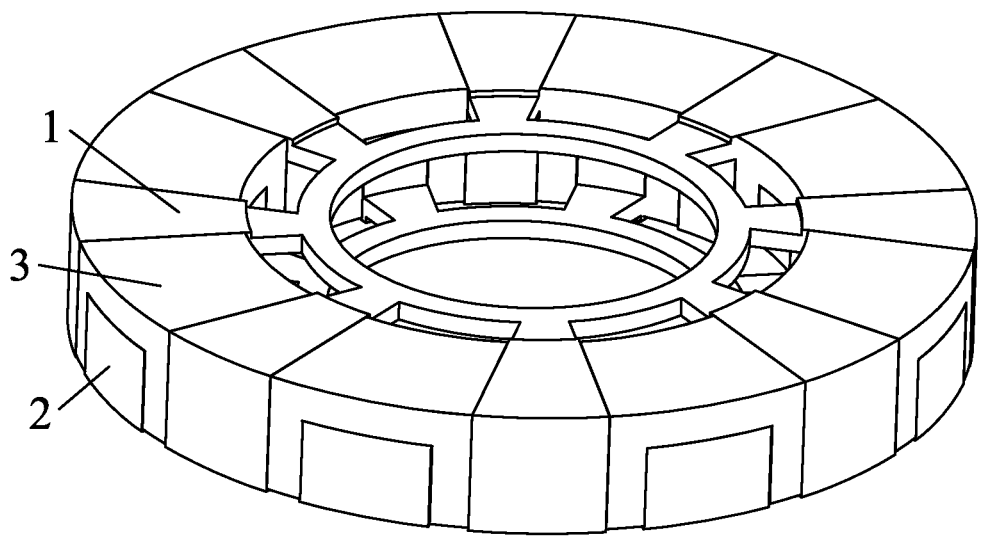
FIG. 2 is a three-dimensional structure of a rotor provided in Example 1 of the disclosure.
Figure 3:
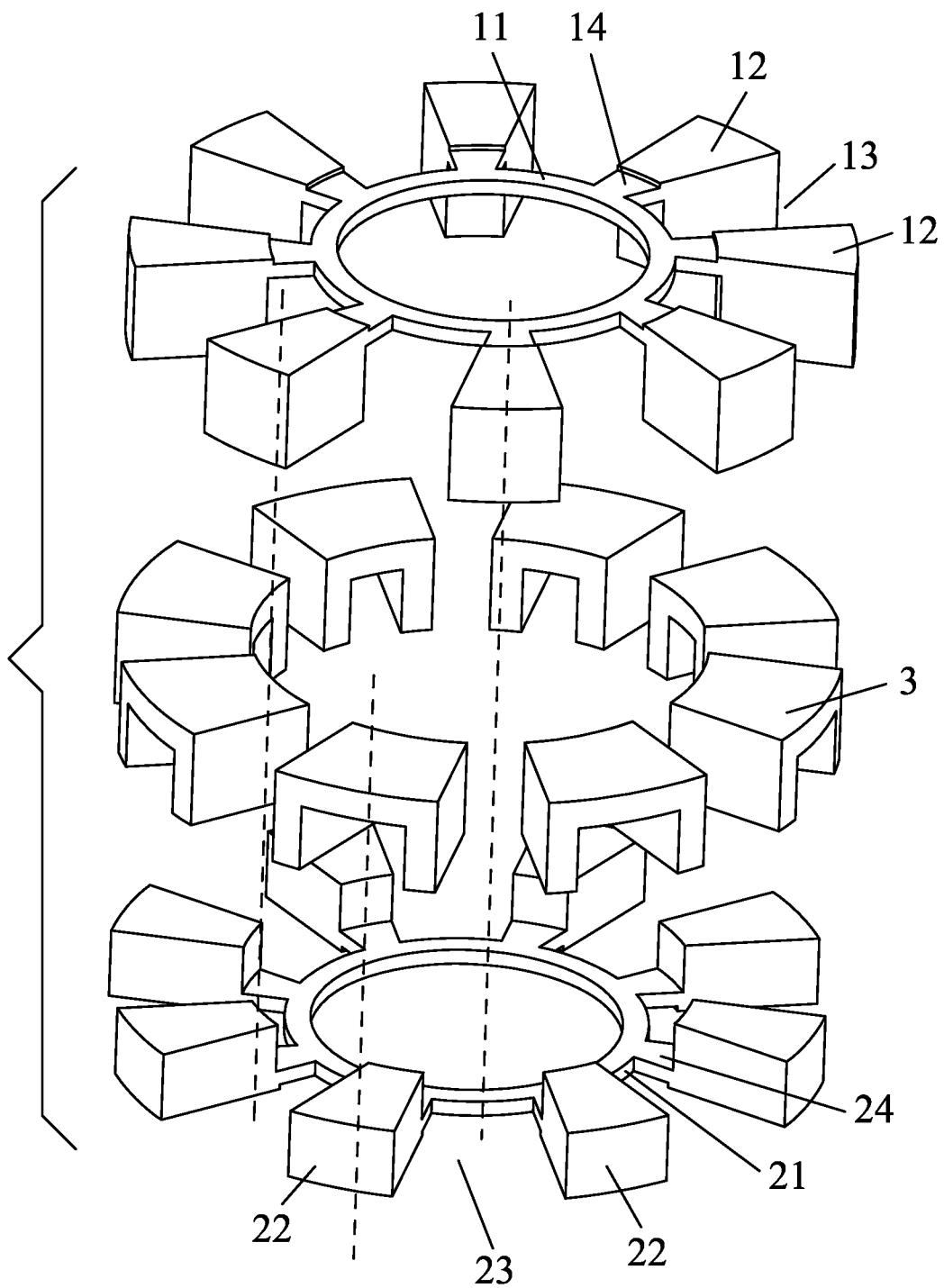
FIG. 3 is an exploded view of a rotor provided in Example 1 of the disclosure.
Figure 4:
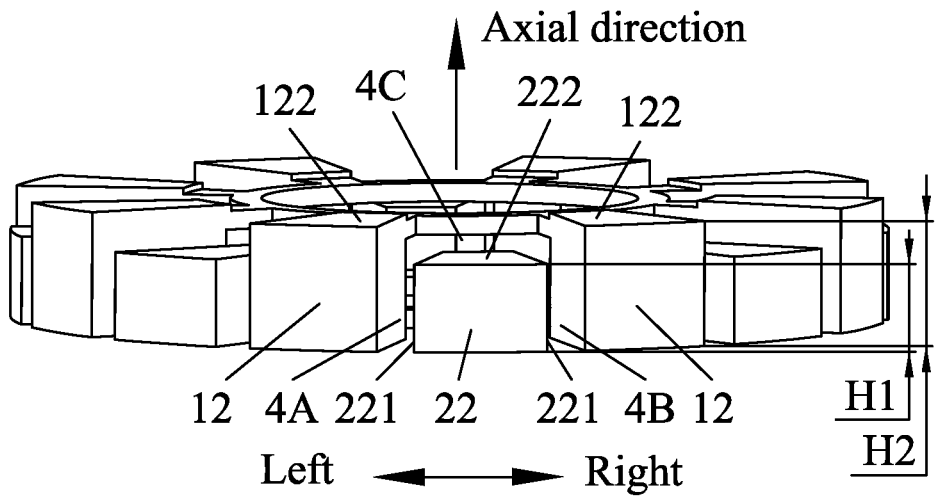
FIG. 4 is a combination diagram of the first rotor iron core and the second rotor iron core provided in Example 1 of the disclosure.
Figure 5:
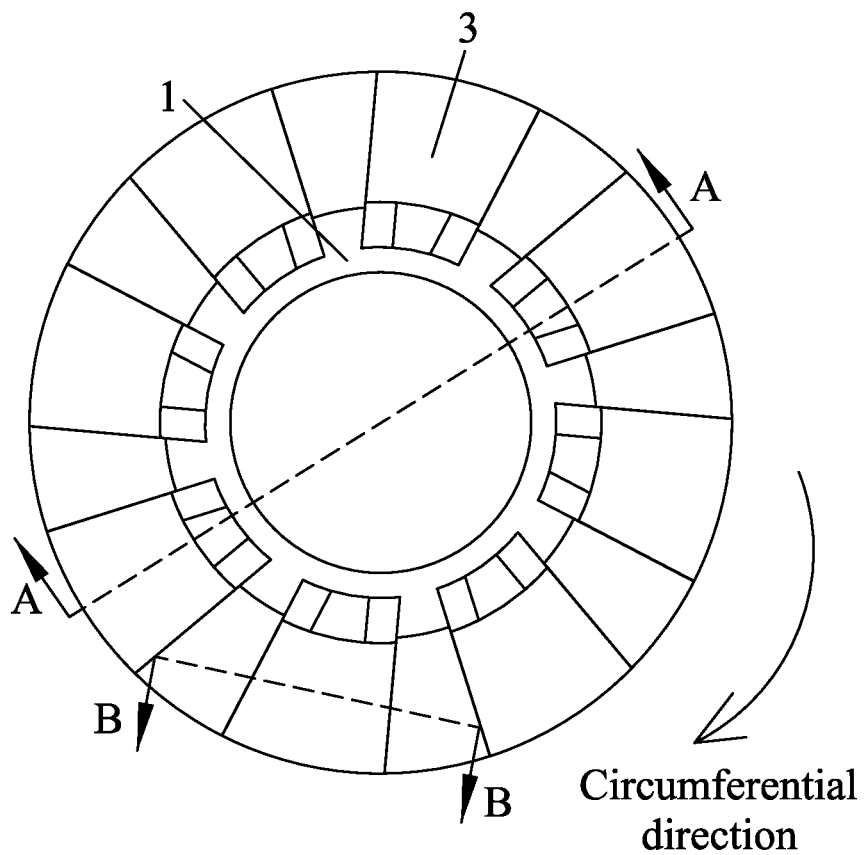
FIG. 5 is a front view of a rotor provided in Example 1 of the disclosure.
Figure 6:
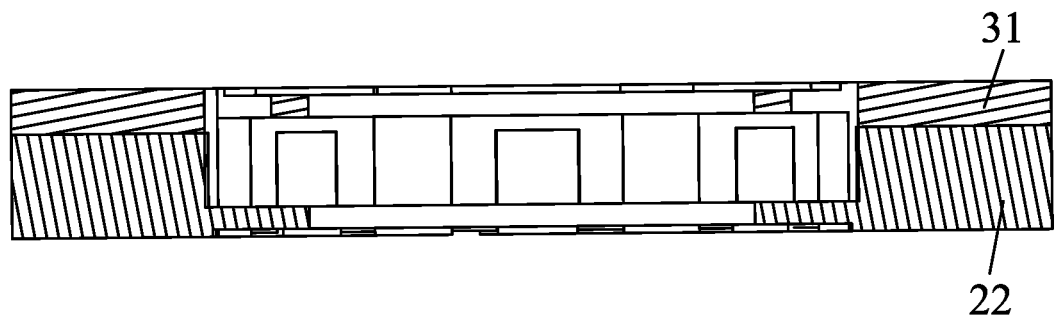
FIG. 6 is a cross-sectional view taken from line A-A in FIG. 5.
Figure 7:
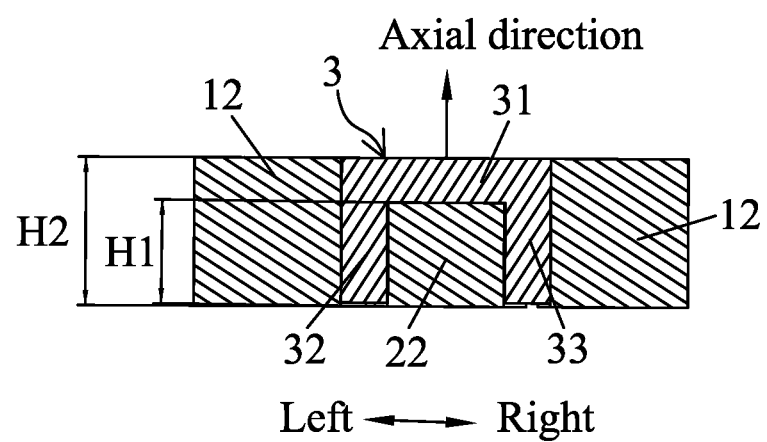
FIG. 7 is a cross-sectional view taken from line B-B in FIG. 5.

As shown in FIGS. 2 and 7, the disclosure provides a rotor for a disc permanent magnet motor comprising: a first rotor core 1; a second rotor core 2; and a plurality of magnetic tiles 3. The first rotor core 1 comprises a first annular ring 11 and a plurality of first magnetic blocks 12 protruding at intervals from an outer side of the first annular ring 11 in a circumferential direction, and a first groove 13 is formed between every two adjacent first magnetic blocks 12; the second rotor core 2 comprises a second annular ring 21 and a plurality of second magnetic blocks 22 protruding at intervals from an outer side of the second annular ring 21 in a circumferential direction, and a second groove 23 is formed between every two adjacent second magnetic blocks 22; the first rotor core 1 and the second rotor core 2 are axially embedded with each other; the first magnetic blocks 12 are embedded in second grooves 23, and the second magnetic blocks 22 are embedded in first grooves 13; each of the plurality of second magnetic blocks 22 comprises two sides 221, and a first side groove 4A and a second side groove 4B are respectively formed between the two sides and two adjacent first magnetic blocks 12; an axial thickness H1 of the second magnetic blocks 22 is smaller than an axial thickness H2 of the first magnetic blocks 12, so that a first top surface 222 of the second magnetic blocks 22 is lower than a second top surface 122 of two adjacent first magnetic blocks 12, thereby forming a top groove 4C on the second magnetic blocks 22; and each of the plurality of magnetic tiles 3 comprises a top tile 31, a first side tile 32 and a second side tile 33, and the first side tile 32 and the second side tile 33 are respectively connected to two ends of the top tile 31; the top tile 31 is embedded in the top groove 4C, and the first side tile 32 and the second side tile 33 are respectively embedded in the first side groove 4A and the second side groove 4B, respectively.

With the technical solution, the magnetic tiles 3 comprise the top tile 31, the first side tile 32 and the second side tile 33, so that the rotor comprises axial and radial magnetic fields. Under the mixed effect of axial and radial magnetic fields, the magnetic field density is increased, achieving mixed magnetization of the rotor, thereby improving the magnetization effect of the motor. In addition, due to the simplification of the first rotor core 1 and the second rotor core 2, the number of assembled parts for the rotor is reduced, which can effectively reduce the difficulty of the rotor manufacturing process and improve the production efficiency of the rotor.

Figure 9:
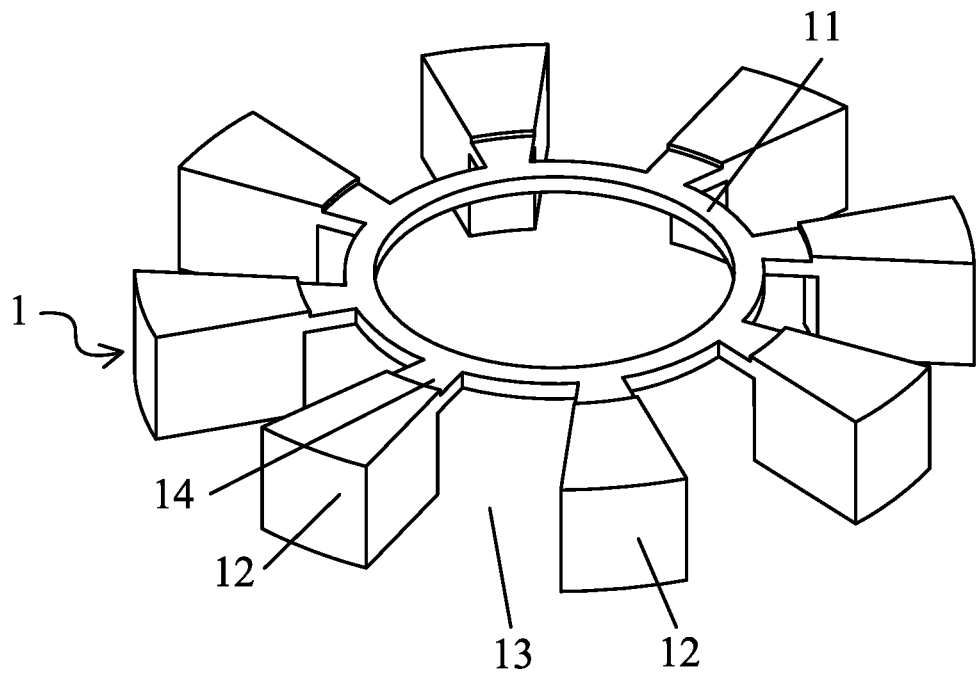
FIG. 9 is a schematic diagram of a first rotor core provided in Example 1 of the disclosure.
Figure 10:
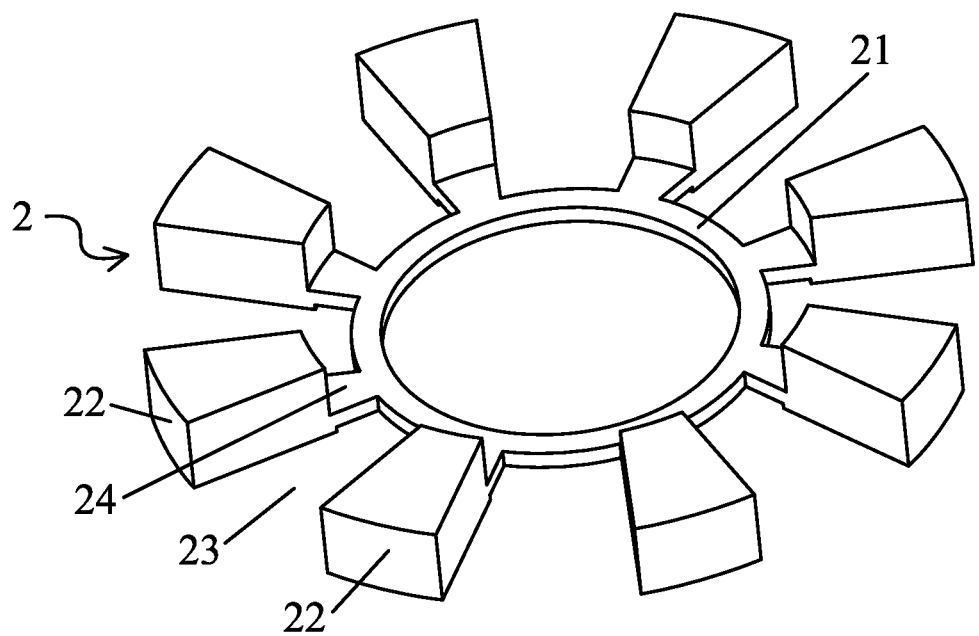
FIG. 10 is a schematic diagram of a second rotor core provided in Example 1 of the disclosure.

As shown in FIGS. 9 and 10, each of the first magnetic blocks 12 is connected to the first annular ring 11 through a first connecting rib 14; a thickness of the first annular ring 11 is the same as that of the first connecting rib, and the axial thickness of the first magnetic blocks 12 is greater than the thickness of the first annular ring 11; each of the second magnetic blocks 22 is connected to the second annular ring 21 through a second connecting rib 24; a thickness of the second annular ring 21 is the same as that of the second connecting rib, and the axial thickness of the second magnetic blocks 22 is greater than the thickness of the second annular ring 21; the first annular ring 11 is integrated with the first connecting rib 14 and located at a top end of the rotor; the second annular ring 21 is integrated with the second connecting rib 24 and located at a bottom end of the rotor; and the first annular ring 11 is spaced apart from the second annular ring 21. Thus, the first rotor core 1 and the second rotor core 2 will not interfere during installation, and the first magnetic blocks 12 and the second magnetic blocks 22 can be installed in a staggered manner, so that the magnetism of the magnetic tiles 3 is not weakened, thus ensuring the magnetic focusing effect of the rotor.

As shown in FIG. 7, the cross-sectional shape of the magnetic tile 3 is a "U" shape. The top tile 31 is a fan-shaped plate. The first side tile 32 and the second side tile 33 are flat plates. In the example, the first side tile 32 and the second side tile 33 are perpendicular to the top tile 31.

Figure 8:
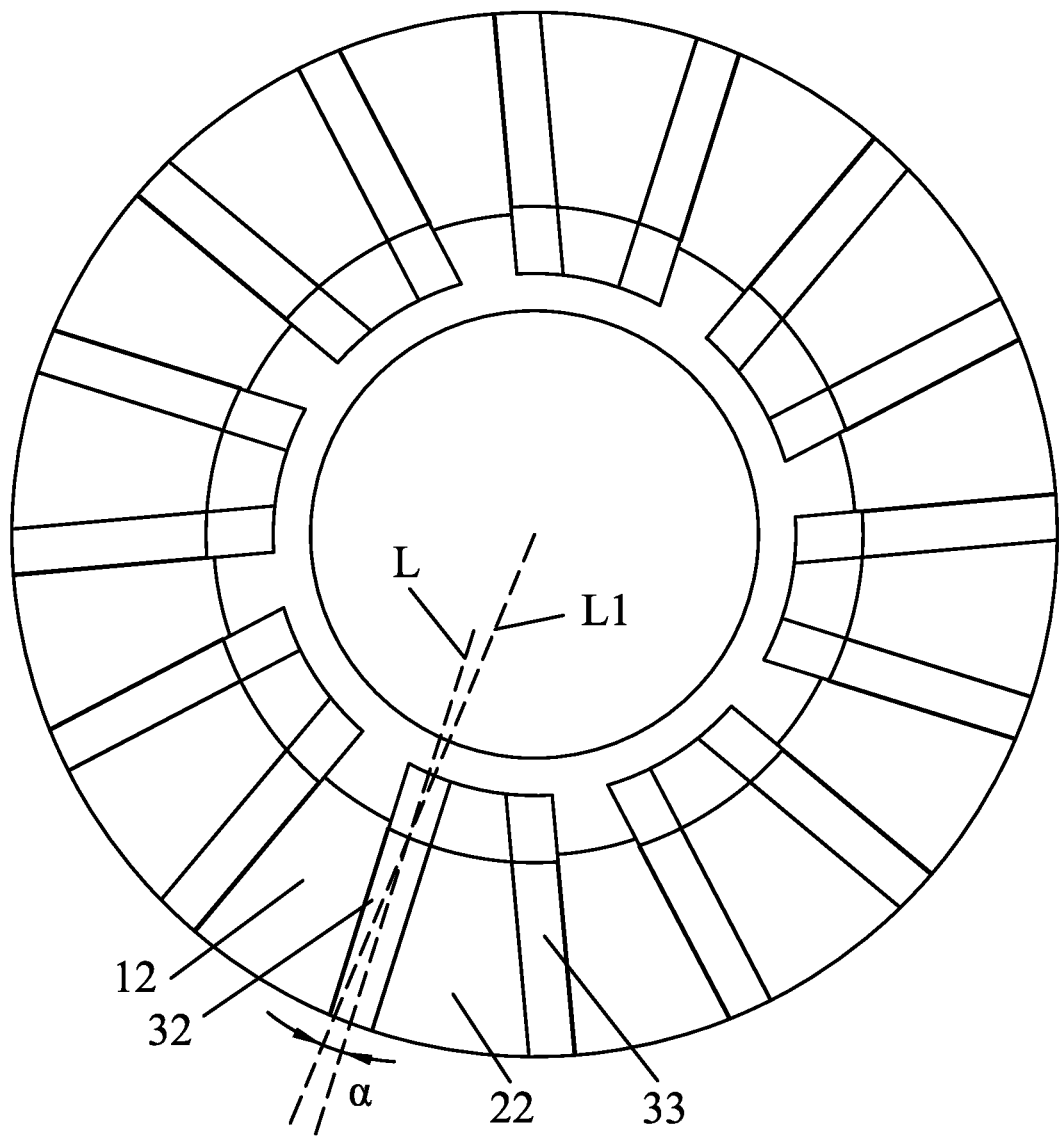
FIG. 8 is a rear view of a rotor provided in Example 1 of the disclosure.

As shown in FIGS. 8, the first side tile 32 and the second side tile 33 are radially aslant embedded into the first side groove 4A and the second side groove 4B, respectively, with an inclination angle α. Thus, the magnetic tiles 3 are slanted pole magnetic tiles 3, which significantly reduces the torque ripple of the permanent disk motor, improves the working efficiency of the motor, and can reduce motor noise and improve motor stability. In this embodiment, the inclination angle α is an included angle between the centerline L of the first side tile 32 or the second side tile 33 and the radial line L1 of the rotor.

Particularly, the inclination angle α is in the range of 2.5°-7.5°, and more particularly, the inclination angle α is 5°.

The first magnetic blocks 12 and the second magnetic blocks 22 are approximately fan-shaped blocks.

Figure 11:
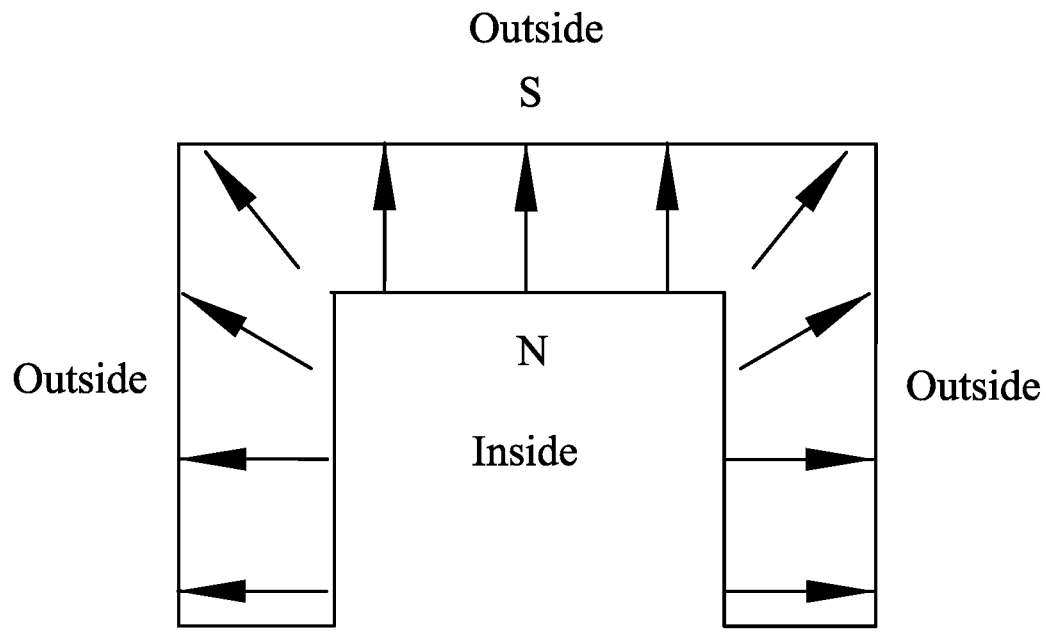
FIG. 11 is a schematic diagram of a magnetization direction of the magnetic tile in Example 1 of the disclosure (from inside to outside)
Figure 12:
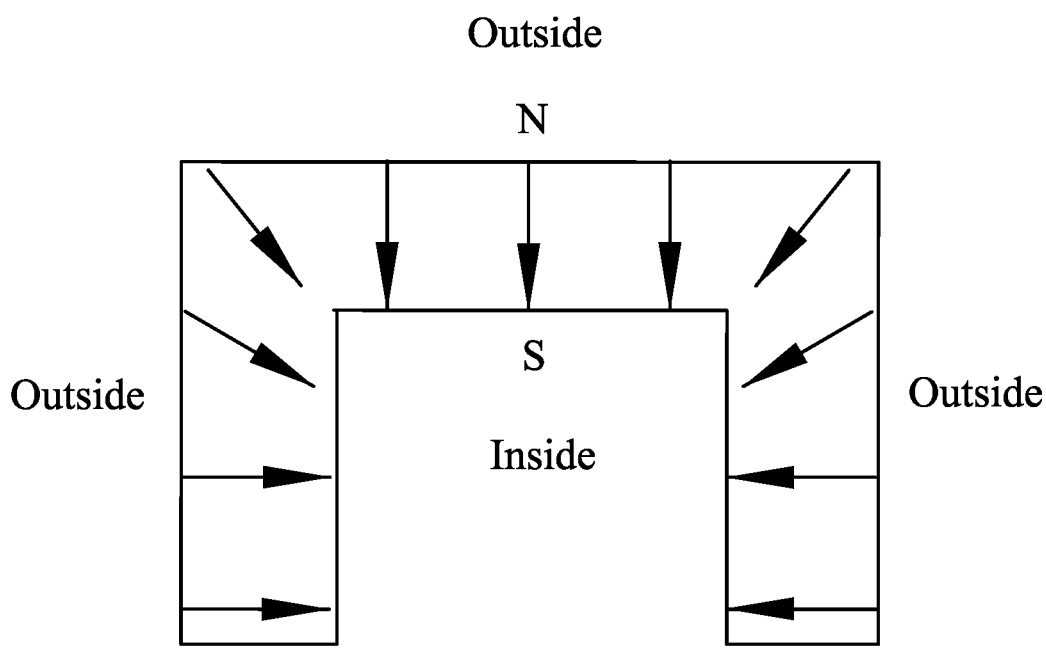
FIG. 12 is a schematic diagram of a magnetization direction of the magnetic tile in Example 1 of the disclosure (from outside to inside)

As shown in FIGS. 11 and 12, the magnetization directions of the magnetic tiles 3 are consistent, from inside to outside or from outside to inside.

When assembling the rotor, as long as the installation direction of each magnetic tile 3 is consistent, no need to deliberately distinguish the polarity of the magnetic tile 3, thus avoiding the motor damage caused by incorrect polarity of the magnetic tile 3 and facilitating the assembly.

Example 2

Figure 13:
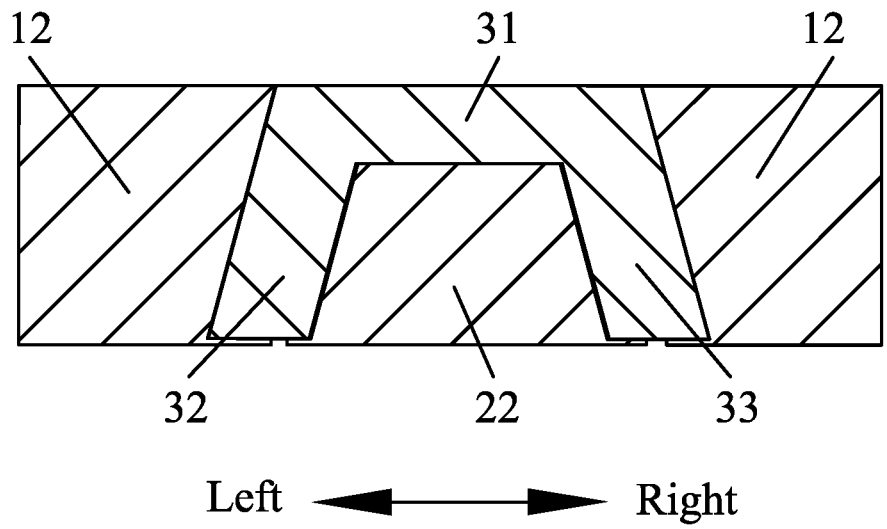
FIG. 13 is a combination diagram of a first rotor core, a second rotor core, and a magnetic tile in Example 2 of the disclosure.
Figure 14:
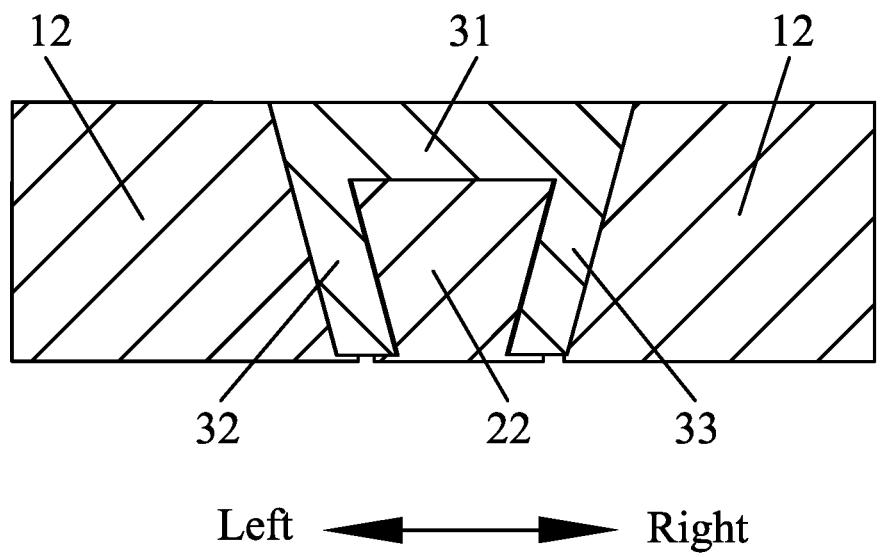
FIG. 14 is another combination diagram of a first rotor core, a second rotor core, and a magnetic tile in Example 2 of the disclosure.
Figure 15:
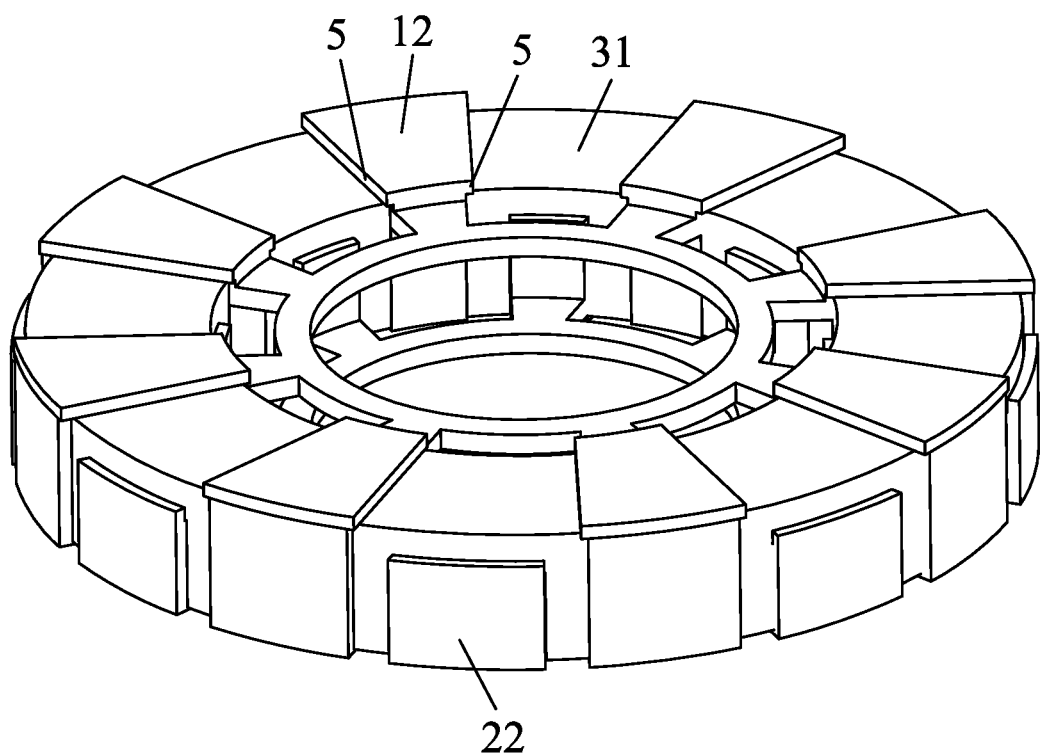
FIG. 15 is a three-dimensional structure of a rotor provided in Example 3 of the disclosure.
Figure 16:
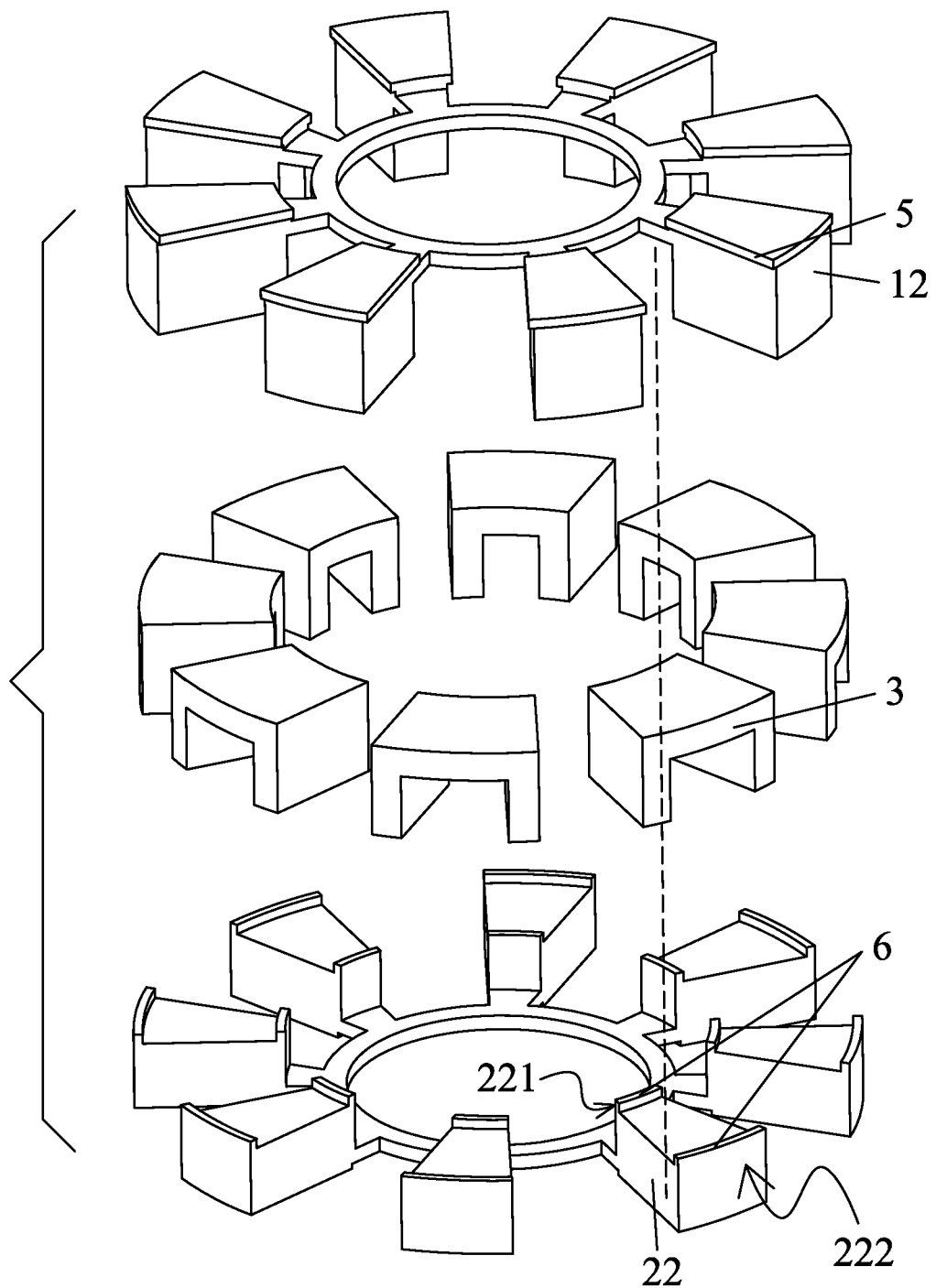
FIG. 16 is an exploded view of a rotor provided in Example 3 of the disclosure.
Figure 17:
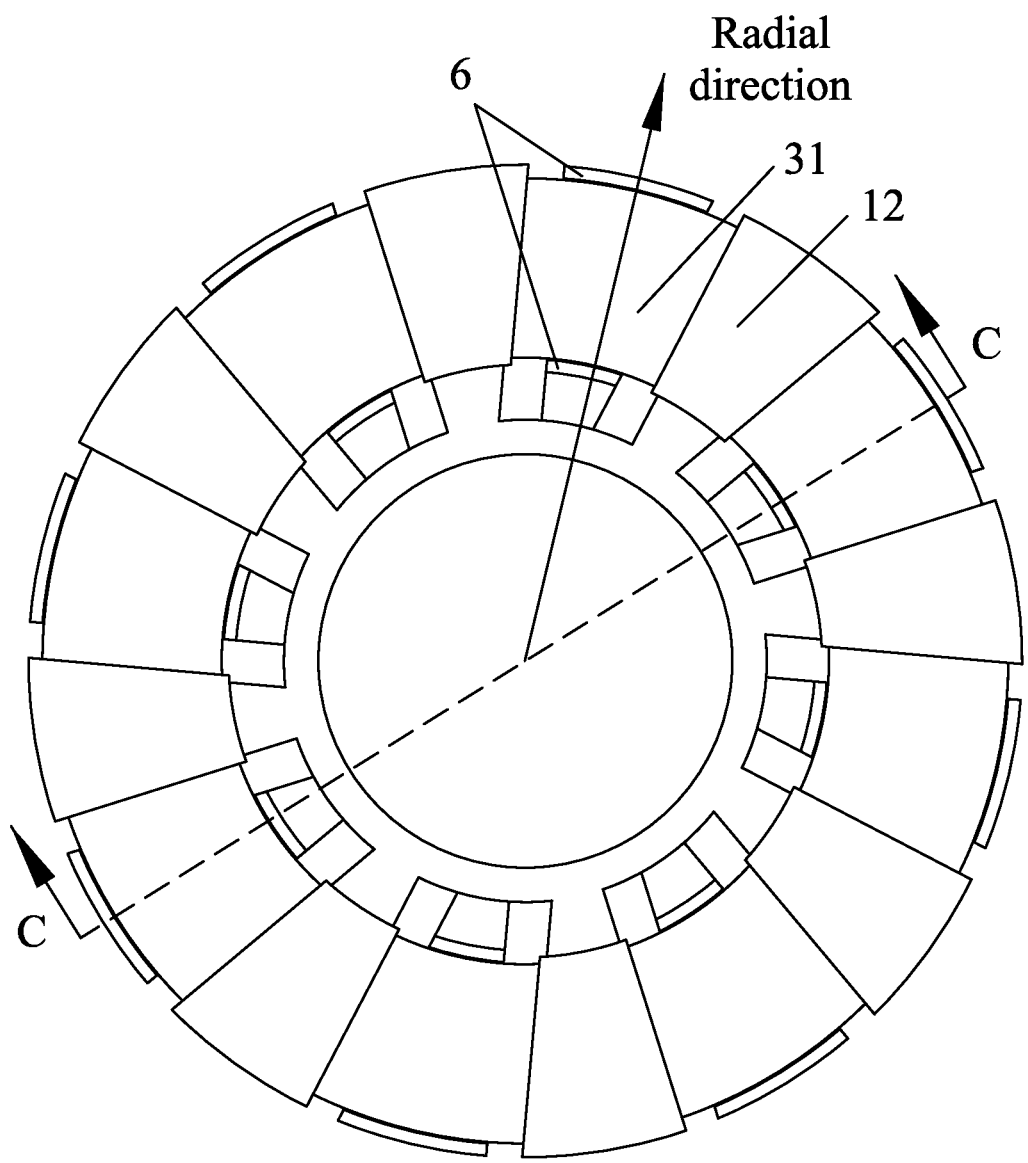
FIG. 17 is a front view of a rotor provided in Example 3 of the disclosure.
Figure 18:
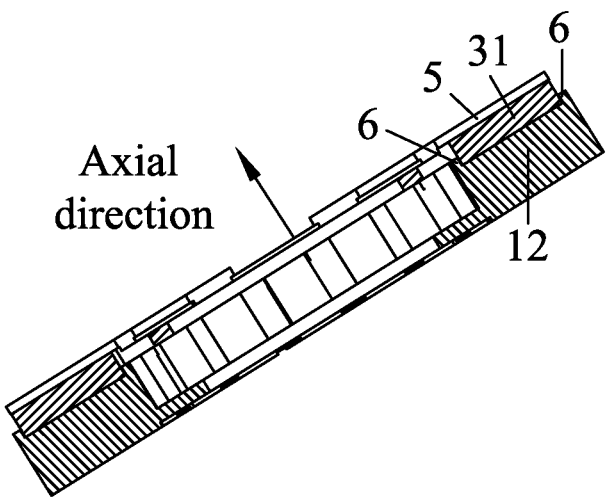
FIG. 18 is a cross-sectional view taken from line C-C in FIG. 17.

As shown in FIGS. 13-14, the example is basically the same as that in example 1 except that the first side tile 32 and the second side tile 33 are inclined to the top tile 31, and the angle between the first side tile 32/the second side tile 33 and the top tile 31 is an obtuse angle or an acute angle.

Example 3

As shown in FIGS. 15-18, the example is a modification based on example 1. Specifically, two sides of a top surface of each of the first magnetic blocks 12 comprise a first flange 5, and two first flanges abut against the top tile 31 to limit the axial movement of the magnetic tiles 3; an inner end 223 and an outer end 222 of each of the second magnetic blocks 22 comprise a second flange 6, and the top tile 31 is disposed between two second flanges 6, and thus a radial movement of the magnetic tiles 3 is limited. The first flange 5 and the second flange 6 can directly fix the magnetic tiles 3 without the need of adhesive, simplifying the assembly and improving production efficiency.

Example 4

Figure 19:
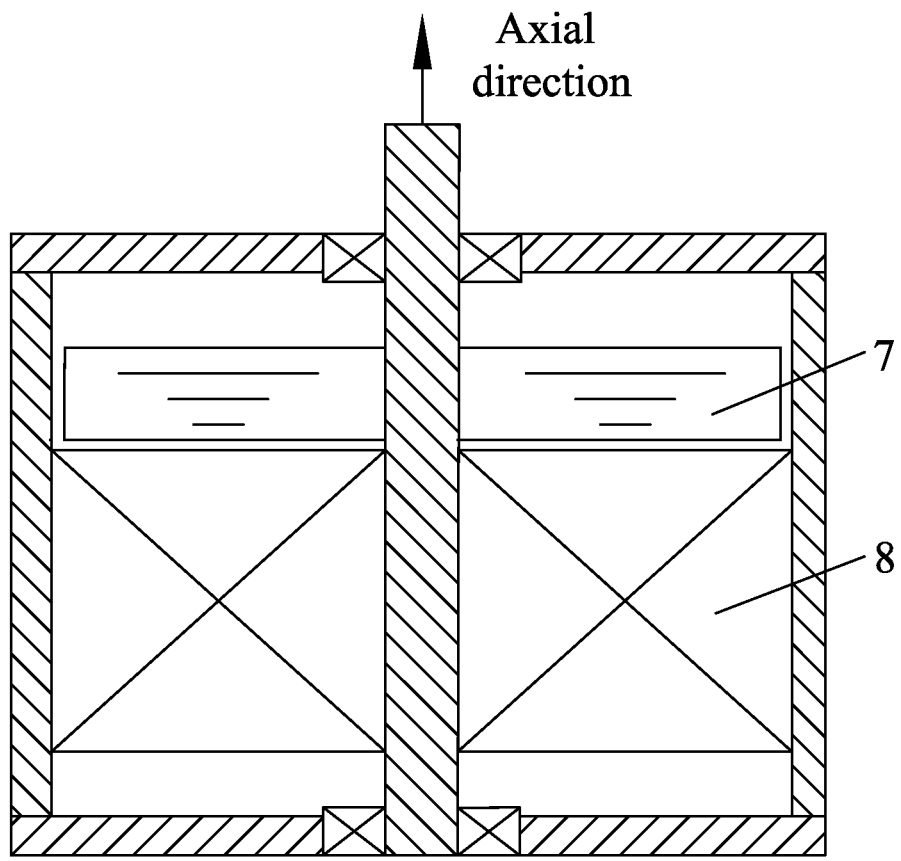
FIG. 19 is a schematic diagram of a disc permanent magnet motor in Example 4 of the disclosure.

As shown in FIG. 19, the disclosure also provides a disc permanent magnet motor comprising a stator assembly 7 and a rotor assembly 8; the stator assembly 7 is axially magnetically coupled to the rotor assembly 8, and the rotor assembly comprises the rotor of any one of examples 1-3.

It will be obvious to those skilled in the art that changes and modifications may be made, and therefore, the aim in the appended claims is to cover all such changes and modifications.

What is claimed is:

1. A rotor for a disc permanent magnet motor, comprising:
   a first rotor core;
   a second rotor core; and
   a plurality of magnetic tiles;
wherein:
   the first rotor core comprises a first annular ring and a plurality of first magnetic blocks protruding at intervals from an outer side of the first annular ring in a circumferential direction, and a first groove is formed between every two adjacent first magnetic blocks;
   the second rotor core comprises a second annular ring and a plurality of second magnetic blocks protruding at intervals from an outer side of the second annular ring in a circumferential direction, and a second groove is formed between every two adjacent second magnetic blocks;
   the first rotor core and the second rotor core are axially embedded with each other; the first magnetic blocks are embedded in second grooves, and the second magnetic blocks are embedded in first grooves;
   each of the plurality of second magnetic blocks comprises two sides, and a first side groove and a second side groove are respectively formed between the two sides and two adjacent first magnetic blocks; an axial thickness H1 of the second magnetic blocks is smaller than an axial thickness H2 of the first magnetic blocks, so that a first top surface of the second magnetic blocks is lower than a second top surface of two adjacent first magnetic blocks, thereby forming a top groove on the second magnetic blocks; and
   each of the plurality of magnetic tiles comprises a top tile, a first side tile and a second side tile, and the first side tile and the second side tile are respectively connected to two ends of the top tile; the top tile is embedded in the top groove, and the first side tile and the second side tile are respectively embedded in the first side groove and the second side groove, respectively.

2. The rotor of claim 1, wherein each of the first magnetic blocks is connected to the first annular ring through a first connecting rib; a thickness of the first annular ring is the same as that of the first connecting rib, and the axial thickness of the first magnetic blocks is greater than the thickness of the first annular ring.

3. The rotor of claim 2, wherein each of the second magnetic blocks is connected to the second annular ring through a second connecting rib; a thickness of the second annular ring is the same as that of the second connecting rib, and the axial thickness of the second magnetic blocks is greater than the thickness of the second annular ring.

4. The rotor of claim 3, wherein a cross-sectional shape of the magnetic tile is a "U" shape.

5. The rotor of claim 1, wherein the top tile is a fan-shaped plate.

6. The rotor of claim 5, wherein the first magnetic blocks and the second magnetic blocks are fan-shaped blocks.

7. The rotor of claim 1, wherein the first side tile and the second side tile are flat plates, and are radially aslant embedded into the first side groove and the second side groove, respectively, with an inclination angle α.

8. The rotor of claim 7, wherein the inclination angle α is in the range of 2.5°-7.5°.

9. The rotor of claim 3, wherein the first annular ring is integrated with the first connecting rib and located at a top end of the rotor; the second annular ring is integrated with the second connecting rib and located at a bottom end of the rotor; and the first annular ring is spaced apart from the second annular ring.

10. The rotor of claim 1, wherein the first side tile and the second side tile are perpendicular to the top tile or are inclined relative to the top tile.

11. The rotor of claim 1, wherein two sides of a top surface of each of the first magnetic blocks comprise a first flange, and two first flanges abut against the top tile to limit an axial movement of the magnetic tiles; an inner end and an outer end of each of the second magnetic blocks comprise a second flange, and the top tile is disposed between two second flanges, and thus a radial movement of the magnetic tiles is limited.

12. The rotor of claim 1, wherein magnetization directions of the magnetic tiles are consistent, from inside to outside or from outside to inside.

13. A disc permanent magnet motor comprising a stator assembly and a rotor assembly; wherein the stator assembly is axially magnetically coupled to the rotor assembly, and the rotor assembly comprises the rotor of claim 1.

* * * * *